(12) United States Patent
Yun et al.

(10) Patent No.: US 9,887,398 B2
(45) Date of Patent: Feb. 6, 2018

(54) ELECTROCHEMICAL DEVICE AND BATTERY MODULE HAVING IMPROVED VIBRATION-RESISTANCE

(71) Applicant: LG Chem, Ltd., Seoul (KR)

(72) Inventors: Sook Yun, Daejeon (KR); Cha-Hun Ku, Daejeon (KR); Sun-Ju Park, Daejeon (KR); Pil-Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 433 days.

(21) Appl. No.: 14/541,336

(22) Filed: Nov. 14, 2014

(65) Prior Publication Data

US 2015/0072216 A1    Mar. 12, 2015

Related U.S. Application Data

(63) Continuation of application No. PCT/KR2014/004770, filed on May 28, 2014.

(30) Foreign Application Priority Data

Jun. 11, 2013  (KR) .......................... 10-2013-0066734

(51) Int. Cl.
*H01M 2/02* (2006.01)
*H01M 2/04* (2006.01)
(Continued)

(52) U.S. Cl.
CPC .............. *H01M 2/06* (2013.01); *H01M 2/021* (2013.01); *H01M 2/0212* (2013.01); *H01M 2/08* (2013.01);
(Continued)

(58) Field of Classification Search
CPC ............. H01M 10/052; H01M 10/058; H01M 10/4207; H01M 2220/30; H01M 2/021;
(Continued)

(56) References Cited

U.S. PATENT DOCUMENTS

2007/0202399 A1* 8/2007 Shin ...................... H01M 2/021
                                                                 429/181
2007/0207377 A1    9/2007 Han et al.
(Continued)

FOREIGN PATENT DOCUMENTS

EP    2475024 A2    7/2012
EP    2602842 A1    6/2013
(Continued)

OTHER PUBLICATIONS

International Search Report from PCT/KR2014/004770 dated Sep. 29, 2014.
(Continued)

*Primary Examiner* — Basia A Ridley
*Assistant Examiner* — Heng M. Chan
(74) *Attorney, Agent, or Firm* — Lerner, David, Littenberg, Krumholz & Mentlik, LLP

(57) ABSTRACT

The present disclosure relates to an electrochemical device and a battery module having improved anti-vibration. In the electrochemical device and the battery module according to one embodiment of the present disclosure which are mounted in electrically powered tools or other equipments, tap holders for providing vibration-resistance are provided on the outer surface of a cathode tap or an anode tap exposed to the outside of the electrochemical device or the battery module, thereby dispersing external force applied to the cathode tap or the anode tap to prevent the cathode tap or the anode tap from being damaged, and immobilizing the cathode tap or the anode tap to prevent an external short circuit, and eventually to improve the stability of the electrochemical device and the battery module.

14 Claims, 3 Drawing Sheets

(51) Int. Cl.
  *H01M 2/06* (2006.01)
  *H01M 2/08* (2006.01)
  *H01M 2/10* (2006.01)
  *H01M 2/30* (2006.01)
  *H01M 10/052* (2010.01)
  *H01M 10/058* (2010.01)
  *H01M 10/42* (2006.01)
(52) U.S. Cl.
  CPC ....... *H01M 2/1022* (2013.01); *H01M 2/1061* (2013.01); *H01M 2/30* (2013.01); *H01M 10/052* (2013.01); *H01M 10/058* (2013.01); *H01M 10/4207* (2013.01); *H01M 2220/30* (2013.01); *Y02T 10/7011* (2013.01)
(58) Field of Classification Search
  CPC ........ H01M 2/0212; H01M 2/06; H01M 2/08; H01M 2/1022; H01M 2/1061; H01M 2/30; H01M 2/00; Y02T 10/7011
  See application file for complete search history.

(56) References Cited

U.S. PATENT DOCUMENTS

2011/0117399 A1  5/2011  Ahn et al.
2012/0015226 A1* 1/2012  Kim ................... H01M 2/0262
                                                429/94
2012/0121965 A1* 5/2012  Makino ................ H01M 2/22
                                                429/156
2012/0214027 A1* 8/2012  Ahn ..................... H01M 2/204
                                                429/7
2012/0231310 A1  9/2012  Lachenmeier et al.
2013/0149586 A1* 6/2013  Hong .................... H01M 2/08
                                                429/138

FOREIGN PATENT DOCUMENTS

| | | | | |
|---|---|---|---|---|
| JP | 2001093491 A | | 4/2001 | |
| JP | 2001102014 A | | 4/2001 | |
| JP | 2002-329493 A | | 11/2002 | |
| JP | 2005322647 A | * | 11/2005 | ............. H01M 2/18 |
| JP | 2008300593 A | | 12/2008 | |
| JP | 2009032451 A | * | 2/2009 | |
| KR | 2007-0049553 A | | 5/2007 | |
| KR | 2011-0053836 A | | 5/2011 | |
| KR | 2012-0015905 A | | 2/2012 | |
| KR | 2012-0059731 A | | 6/2012 | |

OTHER PUBLICATIONS

Extended Search Report from European Application No. 14810537.2, dated Feb. 15, 2016.

* cited by examiner

# ELECTROCHEMICAL DEVICE AND BATTERY MODULE HAVING IMPROVED VIBRATION-RESISTANCE

CROSS-REFERENCE TO RELATED APPLICATION

This application is a continuation of International Application No. PCT/KR2014/004770 filed on May 28, 2014, which claims priority under 35 USC 119(a) to Korean Patent Application No. 10-2013-0066734 filed in the Republic of Korea on Jun. 11, 2013, the disclosures thereof are incorporated herein by reference.

TECHNICAL FIELD

The present disclosure relates to an electrochemical device and a battery module having improved anti-vibration, and more particularly an electrochemical device and a battery module whose cathode tap and anode tap are each exposed to the outside of a battery case to disperse external force applied when vibration occurs in the electrochemical device, and the cathode tap and the anode tap are immobilized to prevent an external short circuit, thereby improving vibration-resistance.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them.

In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries.

Meanwhile, electrochemical devices which are mounted as a power supply in electrically powered tools should have good resistance to vibration taking use environment into account. The electrode taps of the electrochemical devices may be damaged by external force due to vibration generated when using the electrically powered tools, and a short circuit between the cathode tap and the anode tap may occur.

Therefore, there is a need for developing an electrochemical device having improved vibration-resistance to be effectively used in electrically powered tools or other equipments.

DISCLOSURE

Technical Problem

The present disclosure is designed to solve the above-mentioned problems, and therefore it is an object of the present disclosure to provide an electrochemical device and a battery module to be mounted in electrically powered tools or other equipments, which have tap holders for providing vibration-resistance on the outer surface of a cathode tap or an anode tap exposed to the outside of the electrochemical device or the battery module, thereby dispersing external force applied to the cathode tap or the anode tap, and immobilizing the cathode tap or the anode tap to prevent an external short circuit, and eventually to improve vibration-resistance.

Technical Solution

In accordance with one aspect of the present disclosure, there is provided an electrochemical device, comprising an electrode assembly including a cathode comprising a protruded cathode tap, an anode comprising a protruded anode tap, and a separator interposed between the cathode and the anode; a battery case receiving the electrode assembly therein so that the cathode tap and the anode tap are exposed to the outside of the case; a non-aqueous electrolyte solution introduced in the battery case to be impregnated into the electrode assembly; and a tap holder formed on the outer surface of the cathode tap and the anode tap being each exposed to the outside of the battery case, so as to provide vibration-resistance.

The tap holder may be thermally fused to the cathode tap and the anode tap being each exposed to the outside of the battery case.

The tap holder has holes for fitting the cathode tap and the anode tap being each exposed to the outside of the battery case.

The exposure of the cathode tap and the anode tap to the outside of the battery case may be made in the same side of the battery case or in the side opposite to the battery case.

The tap holder may be formed in an integrated form on the outer surface of the cathode tap and the outer surface of the anode surface tap.

Alternatively, the tap holder may comprise a first tap holder formed on the outer surface of the cathode tap and a second tap holder formed on the outer surface of the anode tap, the first tap holder and the second tap holder being separated from each other.

The tap holder may comprise a heat-resistant resin.

The heat-resistant resin may be any one selected from the group consisting of polypropylene (PP), thermoplastic polyester elastomer (TPEE), polybutylene terephthalate (PBT), polyphenylene sulfide (PSS), polytetrafluoroethylene (PTFE), fluorinated ethylene-propylene copolymer (FEP), perfluoroalkoxy (PFA), and a mixture thereof.

The tap holder may have a thickness of 0.1 to 15 mm.

Meanwhile, the cathode may have an active material comprising a lithium-containing oxide.

The lithium-containing oxide may be a lithium-containing transition metal oxide. The lithium-containing transition metal oxide may be any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0≤y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), $Li_xFePO_4$ (0.5<x<1.3) and a mixture thereof.

The anode may have an anode active material comprising metallic lithium, a carbon-based material, a metal compound or a mixture thereof.

The metal compound may be a compound containing at least one metal selected from Si, Ge, Sn, Pb, P, Sb, Bi, Al, Ga, In, Ti, Mn, Fe, Co, Ni, Cu, Zn, Ag, Mg, Sr, Ba, and a mixture thereof.

The electrochemical device may be a lithium secondary battery.

Also, the electrochemical device may have a cylindrical, prismatic, or pouch shape.

In accordance with another aspect of the present disclosure, there is provided a battery module comprising two or more electrochemical devices laminated in their width or height directions, the electrochemical devices each comprising an electrode assembly including a cathode comprising a protruded cathode tap, an anode comprising a protruded anode tap, and a separator interposed between the cathode and the anode; a battery case receiving the electrode assembly therein so that the cathode tap and the anode tap are exposed to the outside of the case; a non-aqueous electrolyte solution introduced in the battery case to be impregnated into the electrode assembly; and tap holders formed on the outer surface of the two or more cathode taps and the two or more anode taps being each exposed to the outside of the battery case, so as to provide vibration-resistance.

The tap holders may comprise a first tap holder formed on the outer surface of the two or more cathode taps and a second tap holder formed on the outer surface of the two or more anode taps, the first tap holder and the second tap holder being separated from each other.

Advantageous Effects

In the electrochemical device and the battery module of the present disclosure which are mounted in electrically powered tools or other equipments, tap holders for providing vibration-resistance are provided on the outer surface of a cathode tap or an anode tap exposed to the outside of the electrochemical device or the battery module, thereby dispersing external force applied to the cathode tap or the anode tap to prevent the cathode tap or the anode tap from being damaged, and immobilizing the cathode tap or the anode tap to prevent an external short circuit, and eventually to improve the stability of the electrochemical device and the battery module.

DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

<Explanation of Reference Numerals>

| | |
|---|---|
| 100: Electrochemical device | 110: Battery case |
| 120: Electrode assembly | 130, 230: Cathode tap |
| 140, 240: Anode tap | |
| 150, 151, 152, 250, 251, 252: Tap holder | |
| 200: Battery module | |

BEST MODE

Hereinafter, the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments and the drawings proposed herein are just a preferable example for the purpose of illustrations only, not intended to limit the scope of the disclosure, so it should be understood that other equivalents and modifications could be made thereto without departing from the spirit and scope of the disclosure.

Figure 1:
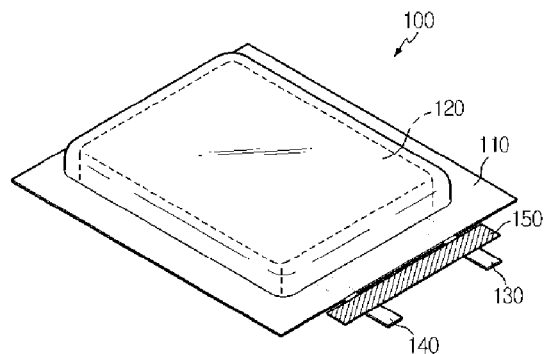
FIG. 1 is a perspective view showing that a tap holder is formed in an integrated form on a cathode tap and an anode tap which are each exposed on the same side in an electrochemical device according to one embodiment of the present disclosure.
Figure 2:
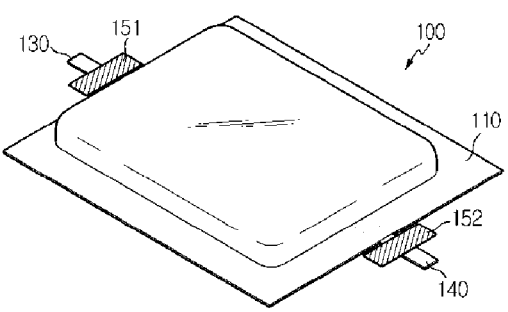
FIG. 2 is a perspective view showing that tap holders are formed on a cathode tap and an anode tap, respectively, the cathode tap and the anode tap being are exposed on sides opposite to each other in an electrochemical device according to another embodiment of the present disclosure.
Figure 3:
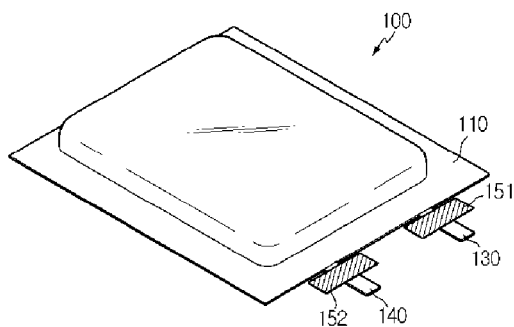
FIG. 3 is a perspective view showing that tap holders are formed on a cathode tap and an anode tap, respectively, the cathode tap and the anode tap being are each exposed on the same side in an electrochemical device according to still another embodiment of the present disclosure.

FIGS. 1 to 3 are perspective views showing that a tap holder(s) is formed in a cathode tap and an anode tap which are each exposed to the outside of an electrochemical device according to one embodiment of the present disclosure.

Referring to FIGS. 1 to 3, the electrochemical device 100 of the present disclosure comprises an electrode assembly 120 including a cathode comprising a protruded cathode tap 130, an anode comprising a protruded anode tap 140, and a separator interposed between the cathode and the anode; a battery case 110 receiving the electrode assembly therein so that the cathode tap 130 and the anode tap 140 are exposed to the outside of the case; a non-aqueous electrolyte solution introduced in the battery case 110 to be impregnated into the electrode assembly 120; and a tap holder(s) 150, 151, 152 formed on the outer surface of the cathode tap 130 and the anode tap 140 being each exposed to the outside of the battery case, so as to provide vibration-resistance.

Electrochemical devices which are mounted in electrically powered tools should have good resistance to vibration since the electrode taps of the electrochemical devices may be damaged by external force due to vibration generated when using the electrically powered tools, and a short circuit between the cathode tap and the anode tap may occur.

Accordingly, in order to enhance the vibration-resistance of electrochemical devices, the present disclosure provides a tap holder for affording a vibration-resistant property on the outer surface of a cathode tap and an anode tap being each exposed of the electrochemical devices, thereby dispersing external force applied to the cathode tap or the anode tap to prevent the cathode tap or the anode tap from being damaged, and immobilizing the cathode tap or the anode tap to prevent an external short circuit, and eventually to improve the stability of the electrochemical device.

The tap holder(s) 150, 151, 152 may be thermally fused to the cathode tap 130 and the anode tap 140 being each exposed to the outside of the battery case 110, and the thermal fusion may be carried out in the state that the tap holder(s) 150, 151, 152 is attached to one surface or both surfaces of the cathode tap 130 and the anode tap 140 with a film or tape, but the present disclosure is not limited thereto. For example, the cathode tap 130 and the anode tap 140 may be fixed by putting them in fixing holes formed in the tap holder(s) 150, 151, 152.

In terms of the improvement of vibration-resistance, it is favorable that the tap holder(s) 150, 151, 152 is formed on the outer surface of the cathode tap 130 and the anode tap 140 while being adjacent to the battery case 110, and the exposure of the cathode tap 130 and the anode tap 140 is minimized.

Meanwhile, the exposure of the cathode tap 130 and the anode tap 140 to the outside of the battery case 110 may be made in the same side of the battery case (FIG. 1) or in the side opposite to the battery case (FIG. 2).

Particularly, in the case that both of the cathode tap 130 and the anode tap 140 are exposed to the same side of the battery case 110, the tap holder 150 may be formed in an integrated form on the cathode tap 130 and the anode surface tap 140, as shown in FIG. 1. Alternatively, as shown in FIG. 3, a first tap holder 151 may be formed on the outer surface of the cathode tap 130 and a second tap holder 152 may be formed on the outer surface of the anode tap 140, these tap holders being separated from each other.

The tap holder(s) 150, 151, 152 may comprise a heat-resistant resin.

The heat-resistant resin may be any one selected from the group consisting of polypropylene (PP), thermoplastic polyester elastomer (TPEE), polybutylene terephthalate (PBT), polyphenylene sulfide (PSS), polytetrafluoroethylene (PTFE), fluorinated ethylene-propylene copolymer (FEP), perfluoroalkoxy (PFA), and a mixture thereof.

Also, the tap holder(s) 150, 151, 152 may have a thickness of 0.1 to 15 mm, but is not limited thereto. That is, the thickness of the tap holder(s) is not particularly limited if it can provide vibration-resistance.

Meanwhile, in the present disclosure, the cathode has a structure wherein a cathode layer comprising a cathode active material, a conductive material and a binder is immersed in one side or both sides of a current collector.

The cathode may have has an active material comprising a lithium-containing oxide.

As the cathode active material, a lithium-containing oxide, preferably, a lithium-containing transition metal oxide may be used. The lithium-containing transition metal oxide may be any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\le y<1$), $Li_xNi_{1-y}Mn_yO_2$ ($0.5<x<1.3$, $O\le y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$), $Li_xFePO_4$ ($0.5<x<1.3$) and a mixture thereof. The lithium-containing transition metal oxide may be coated with a metal such as aluminum (Al) and a metal oxide. In addition, lithium-containing transition metal sulfide, selenide, or halide may also be used.

As the conductive material, any electron-conductive material is not particularly limited if it does not cause a chemical change in an electrochemical device. Generally, carbon black, graphite, carbon fiber, carbon nanotube, metal powders, a conductive metal oxide and an organic conductive material may be used. Examples of a commercially available conductive material include acetylene black-based products (Chevron Chemical Company or Gulf Oil Company), Ketjen Black EC-based products (Armak Company, Vulcan XC-72 (Cabot Company) and Super P (MMM Carbon Company). For example, acetylene black, carbon black and graphite may be used.

The anode has a structure wherein an anode layer comprising an anode active material and a binder is immersed in one side or both sides of a current collector.

As the anode active material, a carbon-based material, lithium metal, a metal compound or a mixture thereof which can conventionally intercalate and disintercalate lithium ions may be used.

Specifically, the carbon-based material may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, meso-carbon microbeads, mesophase pitches, and high-temperature sintered carbon such as petroleum or coal tar pitch derived cokes.

The metal compound may be a compound containing at least one metal selected from Si, Ge, Sn, Pb, P, Sb, Bi, Al, Ga, In, Ti, Mn, Fe, Co, Ni, Cu, Zn, Ag, Mg, Sr and Ba, or a mixture thereof. Such a metal compound may be used in the form of a combination, an alloy, an oxide (e.g., $TiO_2$ and $SnO_2$), a nitride, a sulfide, a boride, an alloy with lithium and any other form, and among these, forms such as a combination, an alloy, an oxide and an alloy with lithium can provide the high capacity of a battery. In particular, a compound containing at least one metal selected from Si, Ge and Sn, preferably Si and Sn can provide even higher capacity of a battery.

The binder used in the cathode and anode functions to maintain cathode and anode active materials in a current collector and connect active materials with each other, and may be any one which is conventionally used.

For example, various kinds of polymer binders including vinylidene fluoride-hexafluoropropylene copolymer (PVDF-co-HFP), polyvinylidene fluoride, polyacrylonitrile, polymethylmethacrylate, styrene butadiene rubber (SBR) and carboxymethyl cellulose (CMC) may be used.

The current collector used in the cathode and anode may be made of any high conductive metal as long as a slurry of the active material can easily adhere and has no reactivity within the voltage range of a battery. Specifically, non-limiting examples of a cathode current collector include aluminum foils, nickel foils and a combination thereof, and non-limiting examples of an anode current collector include copper foils, gold foils, nickel foils, copper alloy foils and a combination thereof. The current collector may be used in a laminated form of substrates made of such materials.

Each of the cathode and anode may be prepared by mixing an active material, a binder and a solvent having a high boiling point to form an electrode composite and applying the composite on the copper foil of a current collector, followed by drying, pressing and then heat-treatment at a temperature of 50 to 250° C. under vacuum for about 2 hours.

Also, the cathode has a layer thickness (per one side of a current collector) of 30 to 120 μm, preferably 50 to 100 μm, and the anode has a layer thickness of 1 to 100 μm, preferably 3 to 70 μm. When the cathode and the anode satisfies such a thickness range, a sufficient amount of an active material is provided in the layer of an electrode material to prevent a battery capacity from being lowered and improve cycle and rate characteristics.

Meanwhile, the separator which may be used in the present disclosure includes any one which has been conventionally used in the art, for example, porous membranes or non-woven fabrics made of a polyolefin-based polymer, but is not limited thereto.

The polyolefin-based porous membranes may be obtained from a polymer selected from polyethylenes such as a high-density polyethylene, a linear low-density polyethylene, a low-density polyethylene and an ultra-high molecular weight polyethylene, polypropylene, polybutylene, polypentene, and a mixture thereof.

The non-woven fabric may be a polyolefin-based non-woven fabric, or a non-woven fabric made of a polymer selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate and a mixture thereof. The non-woven fabric may be a spun-bond or melt-blown fabric consisting of a long fiber in structure.

The porous substrate has preferably a thickness of 5 to 50 μm, but is not particularly limited thereto. Also, the porous substrate has a pore size of 0.01 to 50 μm and a porosity of 10 to 95%, but is not particularly limited thereto.

Also, in order to improve the mechanical strength of the separator and the safety of the electrochemical device, a porous coating layer comprising inorganic particles and a polymer binder may further be formed on at least one surface of the porous substrate.

In the porous coating layer, the polymer binder allows the adhesion of inorganic particles so that the inorganic particles can be bound with each other (i.e., the polymer binder connects and immobilizes the inorganic particles therebetween). Also, the porous coating layer comes in contact with the porous substrate by the polymer binder. In the porous coating layer, the inorganic particles are substantially present in contact with each other to form a closest packed structure, and an interstitial volume generated from the contact of the inorganic particles with each other becomes a pore of the porous coating layer.

The inorganic particles are not particularly limited if they are electrochemically stable. That is, the inorganic particles which may be used in the present disclosure are not particularly limited unless an oxidation-reduction reaction occurs in an operating voltage range (for example, 0 to 5 V based on Li/Li$^+$) of an applied electrochemical device. Particularly, inorganic particles having a high dielectric constant can increase the dissociation rate of an electrolyte salt, such as a lithium salt, in a liquid electrolyte, thereby improving an ionic conductivity the electrolyte solution.

Also, inorganic particles having a high dielectric constant may be used to increase a dissociation rate of an electrolyte salt, e.g., a lithium salt, in a liquid electrolyte, thereby improving an ionic conductivity of the electrolyte.

For these reasons, the inorganic particles are preferably inorganic particles having a dielectric constant of 5 or higher, inorganic particles having the ability to transport lithium ions, or a mixture thereof.

Examples of the inorganic particles having a dielectric constant of 5 or higher include $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, SiC and $TiO_2$ inorganic particles, and they may be used alone or as a mixture form.

Among these, inorganic particles such as $BaTiO_3$, $Pb(Zr_xTi_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$) and hafnia ($HfO_2$) exhibit a high dielectric characteristic of a dielectric constant of 100 or higher, as well as piezoelectricity which occurs when constant pressure is applied to induce a potential difference between both surfaces, thereby preventing the generation of internal short circuit between both electrodes due to external impact and thus further improving the safety of electrochemical devices. Also, when a mixture of inorganic particles having a high dielectric constant and inorganic particles having the ability to transport lithium ions is used, the synergetic effect thereof can be obtained.

In the present invention, the inorganic particle having the ability to transport lithium ions refers to inorganic particles containing lithium atom which are capable of moving lithium ions without storing the lithium. The inorganic particle having the ability to transport lithium ions may transfer and move lithium ions due to a kind of defect existing in the particle structure, so it is possible to improve lithium ion conductivity in the battery and also improve the performance of the battery. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, and a mixture thereof.

The polymer binder used to form the porous coating layer may be any one which is conventionally used in the formation of a porous coating layer in the art. The polymer binder has preferably a glass transition temperature ($T_g$) of −200 to 200° C. so as to improve the mechanical properties such as flexibility and elasticity of the coating layer finally formed. Such a polymer binder plays a role of connecting and immobilizing inorganic particles therebetween, thereby preventing the mechanical property of the separator having the porous coating layer from being reduced.

Also, the polymer binder is not necessarily required to have ionic conductivity, however, a polymer having ionic conductivity may be used to improve the performances of electrochemical devices. Accordingly, the polymer binder used in the present disclosure preferably includes one having a high dielectric constant. Actually, the dissociation rate of a salt in an electrolyte solution depends on a dielectric constant of the electrolyte solution. Therefore, as the dielectric constant of the polymer binder is higher, the dissociation rate of a salt in an electrolyte solution increases. In this regard, in the present disclosure, the polymer binder may have a dielectric constant of 1.0 to 100 (measuring frequency=1 kHz), preferably 10 or higher.

In addition, the polymer binder may be gelatinized when impregnated with a liquid electrolyte solution to exhibit a high degree of swelling in an electrolyte solution. In this regard, it is preferred that the polymer binder has a solubility parameter of 15 to 45 $MPa^{1/2}$, more preferably 15 to 25 $MPa^{1/2}$, most preferably 30 to 45 $MPa^{1/2}$. Accordingly, a hydrophilic polymer having many polar groups is favorably used as compared to a hydrophobic polymer such as polyolefine. When the solubility parameter of the polymer is less than 15 $MPa^{1/2}$ or higher than 45 $MPa^{1/2}$, the polymer is difficult to be swelled by a conventional liquid electrolyte solution for a battery.

Non-limiting examples of the polymer binder include polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, and a mixture thereof.

The weight ratio of the inorganic particles and the polymer binder may be in the range of 50:50 to 99:1, preferably 60:40 to 90:10, more preferably 70:30 to 80:20.

Also, the thickness of the porous coating layer formed from the inorganic particles and the polymer binder is not particularly limited, but preferably 0.01 to 20 μm. Also, the pore size and the porosity of the porous coating layer are not particularly limited, but preferably, the pore size may be in the range of 0.01 to 10 μm, and the porosity may be in the range of 5 to 90%.

The electrochemical device of the present disclosure may be any device in which electrochemical reactions may occur, and specific examples of the electrochemical devices include all kinds of primary batteries, secondary batteries, fuel cells, solar cells, or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

Also, the electrochemical device of the present disclosure is not limited to its shape. For example, the shape of the electrochemical device may be cylindrical such as a can, prismatic, pouch, or coin.

Meanwhile, the electrolyte solution used in the present disclosure comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte solution used in the present disclosure comprises an organic solvent which is conventionally used in an electrolyte solution for a lithium secondary battery, for example, ethers, esters, amides, linear carbonates, cyclic carbonates, and a mixture thereof.

Among these, a linear carbonate, a cyclic carbonate, or a mixture thereof are representatively used.

The cyclic carbonate may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. Examples of the halide include fluoroethylene carbonate (FEC) and the like, but are not limited thereto.

The linear carbonate may be selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

The introduction of the non-aqueous electrolyte may be carried out in any suitable step during the manufacturing of the electrochemical device depending on the manufacturing processes and desired physical properties of a final product. Specifically, the electrolyte may be introduced before assembling a battery or in the final step of the assembling.

Meanwhile, in accordance with another aspect of the present disclosure, there is provided a battery module comprising a tap holder(s). FIGS. 4 to 7 are each perspective view showing a battery module in which a tap holder(s) is formed in an integrated form on the outer surface of multiple cathode taps and multiple anode taps in accordance with one embodiment of the present disclosure.

Referring to FIGS. 4 to 7, the battery module 200 of the present disclosure comprises two or more electrochemical devices laminated in their width or height directions, the electrochemical devices each comprising an electrode assembly including a cathode comprising a protruded cathode tap 230, an anode comprising a protruded anode tap 240, and a separator interposed between the cathode and the anode; a battery case receiving the electrode assembly therein so that the cathode tap 230 and the anode tap 240 are exposed to the outside of the case; a non-aqueous electrolyte solution introduced in the battery case to be impregnated into the electrode assembly; and tap holders 250, 251, 252 formed on the outer surface of the two or more cathode taps 230 and the two or more anode taps 240 being each exposed to the outside of the battery case, so as to provide vibration-resistance.

Figure 4:
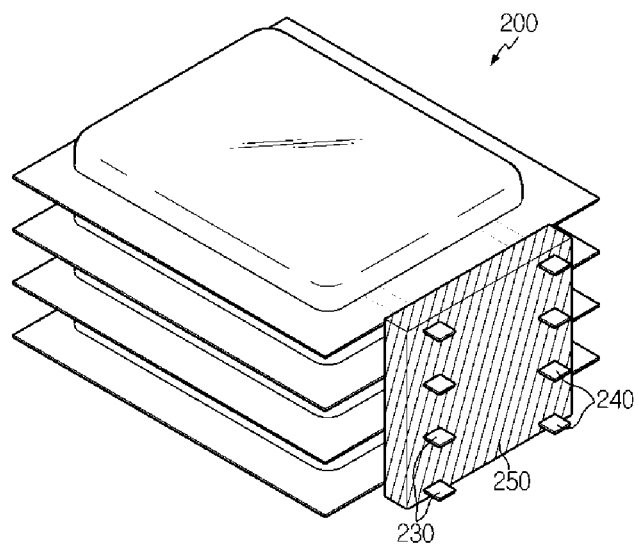
FIG. 4 is a perspective view showing a battery module in which a tap holder is formed in an integrated form on the outer surface of multiple cathode taps and multiple anode taps in accordance with one embodiment of the present disclosure.
Figure 5:
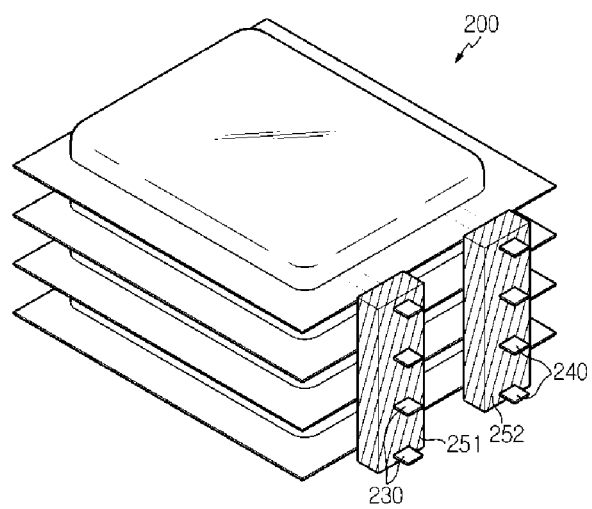
FIG. 5 is a perspective view showing a battery module in which tap holders are each formed on each outer surface of multiple cathode taps and multiple anode taps in accordance with another embodiment of the present disclosure.

As shown in FIG. 4, the tap holder 250 may be formed in an integrated form on the cathode tap 230 and the anode tap 240. Also, as shown in FIG. 5, a first tap holder 251 may be formed on the outer surface of the cathode tap 230 and a second tap holder may be formed on the outer surface of the anode tap 240, the first tap holder and the second tap holder being separated from each other.

Figure 6:
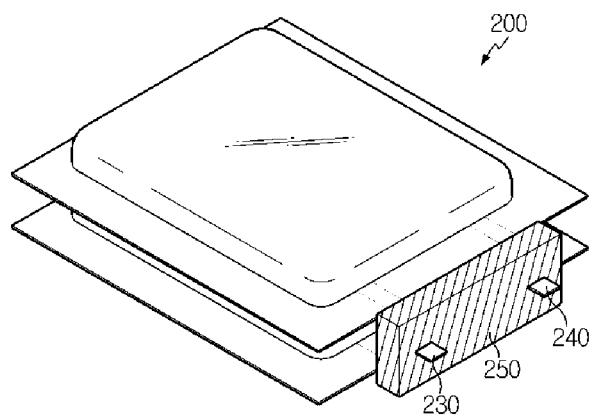
FIG. 6 is a perspective view showing a battery module in which a tap holder is formed in an integrated form on the outer surface of an assembly of multiple cathode taps and an assembly of multiple anode taps in accordance with one embodiment of the present disclosure.
Figure 7:
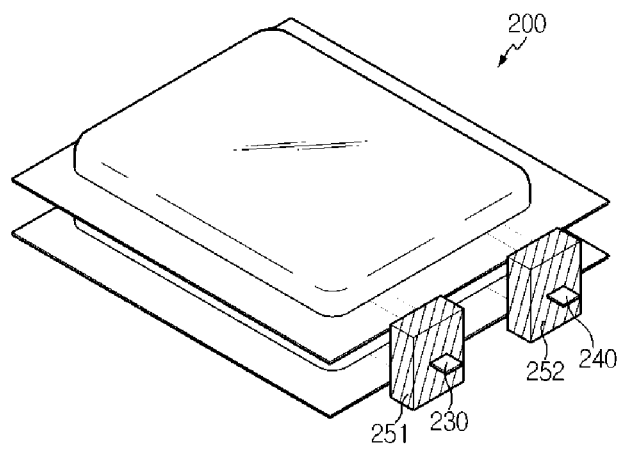
FIG. 7 is a perspective view showing a battery module in which tap holders are each formed on each outer surface of an assembly of multiple cathode taps and an assembly of multiple anode taps in accordance with another embodiment of the present disclosure.

In addition, as shown in FIG. 6, the tap holder 250 may be formed in an integrated form on the outer surface of an assembly of multiple cathode taps 230 and an assembly of multiple anode taps 240. Further, as shown in FIG. 7, a first tap holder 251 may be formed on the outer surface of the two or more cathode taps and a second tap holder 252 may be formed on the outer surface of the two or more anode taps, the first tap holder and the second tap holder being separated from each other.

The tap holders 250, 251, 252 may comprise a heat-resistant resin, as mentioned above, and may be thermally fused to each of the cathode tap 230 and the anode tap 240.

The foregoing disclosure is given by way of illustration only, and various changes and modifications within the spirit and scope of the disclosure will become apparent to those skilled in the art from this detailed description. Accordingly, it should be understood that the Examples of the present disclosure are provided for the purpose of illustrations only and to better explain to a person having ordinary skill in the art, and is not intended to limit the scope of the present disclosure. The scope of the present to be protected should be defined by the claims, all technical spirits equivalent thereto should be interpreted to be fallen within the scope of the present disclosure.

What is claimed is:

1. A battery module, comprising:
   two or more electrochemical devices laminated in their width or height directions, the electrochemical devices each comprising an electrode assembly including a cathode comprising a protruded cathode tap, an anode comprising a protruded anode tap, and a separator interposed between the cathode and the anode; a battery case receiving the electrode assembly therein so that the cathode tap and the anode tap are exposed to an outside of the battery case; and a non-aqueous electrolyte solution introduced in the battery case to be impregnated into the electrode assembly; and
   a single tap holder formed on outer surfaces of the cathode taps and the anode taps of the two or more electrochemical devices, which are each exposed to the outside of the respective battery cases, so as to provide vibration-resistance,
   wherein the single tap holder includes a first hole in which all of the cathode taps are disposed and a second hole in which all of the anode taps are disposed.

2. The battery module according to claim 1, wherein the tap holder is thermally fused to the cathode taps and the anode taps.

3. The battery module according to claim 1, wherein in each of the two or more electrochemical devices, the exposure of the cathode tap and the anode tap to the outside of the battery case is made in the same side of the battery case.

4. The battery module according to claim 1, wherein the tap holder is formed in an integrated form on the outer surfaces of the cathode taps and the outer surfaces of the anode taps.

5. The battery module according to claim 1, wherein the tap holder comprises a heat-resistant resin.

6. The battery module according to claim 5, wherein the heat-resistant resin is any one selected from the group consisting of polypropylene (PP), thermoplastic polyester elastomer (TPEE), polybutylene terephthalate (PBT), polyphenylene sulfide (PSS), polytetrafluoroethylene (PTFE), fluorinated ethylene-propylene copolymer (FEP), perfluoroalkoxy (PFA), and a mixture thereof.

7. The battery module according to claim 1, wherein in at least one of the two or more electrochemical devices, the cathode has an active material comprising a lithium-containing oxide.

8. The battery module according to claim 7, wherein the lithium-containing oxide is a lithium-containing transition metal oxide.

9. The battery module according to claim 8, wherein the lithium-containing transition metal oxide is any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0<y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), $Li_xFePO_4$ (0.5<x<1.3) and a mixture thereof.

10. The battery module according to claim 1, wherein in at least one of the two or more electrochemical devices, the anode has an anode active material comprising metallic lithium, a carbon-based material, a metal compound or a mixture thereof.

11. The battery module according to claim 10, wherein the metal compound is a compound containing at least one metal selected from Si, Ge, Sn, Pb, P, Sb, Bi, Al, Ga, In, Ti, Mn, Fe, Co, Ni, Cu, Zn, Ag, Mg, Sr, Ba, and a mixture thereof.

12. The battery module according to claim 1, wherein at least one of the two or more electrochemical devices is a lithium secondary battery.

13. The battery module according to claim 1, wherein at least one of the two or more electrochemical devices has a cylindrical, prismatic, or pouch shape.

14. A battery module, comprising:
   two or more electrochemical devices laminated in their width or height directions, the electrochemical devices each comprising an electrode assembly including a cathode comprising a protruded cathode tap, an anode comprising a protruded anode tap, and a separator interposed between the cathode and the anode; a battery case receiving the electrode assembly therein so that the cathode tap and the anode tap are exposed to an outside of the battery case; and a non-aqueous electrolyte solution introduced in the battery case to be impregnated into the electrode assembly;
   a first tap holder formed on outer surfaces of the cathode taps of the two or more electrochemical devices, which are each exposed to the outside of the respective battery cases, so as to provide vibration-resistance, wherein the first tap holder includes a hole in which all of the cathode taps are disposed; and
   a second tap holder formed on outer surfaces of the anode taps of the two or more electrochemical devices, which are each exposed to the outside of the respective battery cases, so as to provide vibration-resistance, wherein the second tap holder includes a hole in which all of the anode taps are disposed,
   wherein the first tap holder and the second tap holder are separated from each other.

* * * * *